Patented Aug. 21, 1923.

1,465,853

UNITED STATES PATENT OFFICE.

WILLIAM LEWCOCK AND SNOW BLAGBURN TALLANTYRE, OF LONDON, ENGLAND, ASSIGNORS TO THE GAS LIGHT AND COKE COMPANY, OF LONDON, ENGLAND, A BRITISH COMPANY.

MANUFACTURE OF CONDENSATION PRODUCTS FROM CARBAZOLE AND P-NITROSOPHENOL AND ITS DERIVATIVES.

No Drawing.   Application filed March 27, 1923.   Serial No. 628,034.

*To all whom it may concern:*

Be it known that we, WILLIAM LEWCOCK, a British subject, and SNOW BLAGBURN TALLANTYRE, a British subject, both residing at Beckton, London, England, have invented certain new and useful Improvements in the Manufacture of Condensation Products from Carbazole and P-Nitrosophenol and its Derivatives, of which the following is a specification.

The present invention is for improvements in and relating to the manufacture of dyes derived from carbazole through the condensation of the latter with p-nitrosophenol and its analogues.

In British specification No. 2,918 of 1909, a process is described for the production of an indophenol dye by condensing carbazole with p-nitrosophenol, its homologues or derivatives. A solution of the nitroso-compound in concentrated sulphuric acid (66° Baumé), is added, while stirring well, to a solution in the same acid of carbazole, the temperature not being permitted to rise above 30° C. From the indophenol so produced, sulphide dyes may be obtained by heating the former with alkaline polysulphides, (British specification, No. 2,918 of 1909).

We have found that by effecting these condensations as hereinafter set forth both the yield and the purity of the so derived carbazole-indophenols, as well as the production therefrom of superior quality sulphide dyes of good shade and depth, are markedly improved.

According to this invention, a process for the manufacture of carbazole-derived dyes wherein carbazole is condensed with p-nitrosophenol, its homologues or derivatives, in presence of a condensing agent such as concentrated sulphuric acid, is characterized by bringing the reacting substances together at a temperature not above about minus 5° C. (—5° C.) and maintaining the reaction-mixture throughout the condensation at a temperature below 0° C., that is to say not exceeding zero.

The particular temperature conditions for the condensation depend upon the quality of the sulphide dye desired. Other things being equal, the quality of the said dye is considerably, if perhaps not wholly, influenced by the purity of the indophenol. The lower the temperature at which the condensation is conducted, the purer as a rule is the indophenol, while the final sulphide dye is of better depth than that derived from a condensation product obtained at substantially higher temperatures. Our preferred condensation temperature for the preparation of a first-grade sulphide dye is about minus 20° C. Not only does the lower temperature condensation give a better quality sulphide dye, but one which yields a clearer vat than that given by a dye from a condensation product prepared at a temperature above the preferred degree.

Advantageously, the reaction-mixture is maintained throughout the condensation at substantially the same temperature at which the reacting substances are initially brought together. For instance, if the initial temperature is about minus 20° C., the temperature at the conclusion of the condensation will be as near as possible to minus 20° C. The advantage of conducting the condensation-reaction throughout at a substantially constant low temperature is chiefly in the direction of ensuring uniformity of results and thereby permitting further preparation of the condensation product, and consequently of a given grade sulphide dye, under identical conditions.

After conclusion of the condensation, maintenance of the low temperature employed therefor is not so important and a certain amount of increase is permissible, for instance, when from any cause the reaction mixture cannot immediately be further dealt with, but any substantial rise is to be avoided in order to preclude deterioration of the product.

The condensing agent may be sulphuric acid of sufficient concentration to dissolve the reacting substances, but not so strong as to freeze at the temperature at which the condensation is carried out. For example, acid of 93 per cent strength may be employed, The desired low temperature may be obtained by evaporation of liquefied ammonia, or by the solution of a salt cooled by refrigeration with the aid of liquefied ammonia, the refrigerating agent being passed through a jacket around the reaction-vessel, or through a coil immersed in the reaction-mixture, or in any other convenient manner.

The preferred method of effecting the condensation is by gradual admixture of one reagent in the sub-divided solid state with a sulphuric acid solution of the other. Thus, the solid carbazole in a state of sub-division may be mixed with a sulphuric acid solution of the nitrosophenol, for example, by the addition to the solution of the solid carbazole in such successive charges as will be compatible with the maintenance of the desired low temperature, under continuous and rapid agitation of the reaction-mixture for the purpose of facilitating homogeneous admixture of the carbazole with the solution and of obviating the tendency to excessive local heating.

Alternatively, the nitrosophenol in the solid state may be added to the carbazole dissolved in sulphuric acid with appropriate agitation as aforesaid to secure proper distribution of the solid in the solution.

The reacting substances may also be brought together by spraying or injecting the appropriately cooled solution of the nitrosophenol in the form of a fine stream, or series of fine streams, into the solution of the carbazole at the same temperature, while maintaining the reaction-mixture in agitation for the purpose of preventing excessive local heating and of keeping the requisite average low temperature throughout. The addition of the one solution to the other should be made steadily and the agitation of the mixture should be continuous and thorough.

The reaction-mixture may be kept in agitation for some time after the total quantities of the reagents have been brought together, for instance, for about half-an-hour.

The condensation product may be separated by cautious addition of the reaction-mixture to dilute aqueous alkali in excess. This procedure inhibits decomposition of the indophenol, which is unstable in presence of acid, and the neutralization of the latter enables the subsequent filtration to be carried out at leisure. The filtration and the washing of the material are also more readily performed, and with less liability to loss or contamination of the product through decomposition, than when the attempt is made to deal directly with the condensation product in its acid state. Preferably, the reaction-mixture is admixed with the alkali while at the temperature at which the condensation was concluded. The alkali may conveniently be dilute aqueous ammonia, in which case ammonium sulphate may be recovered as by-product.

The following is a description by way of example of the operation of the invention.

*Example.*

To a solution of 73.6 parts by weight of p-nitrosophenol in about 1736 parts by weight of 93 per cent, sulphuric acid brought within a jacketed lead vessel, provided with an agitator, to a temperature of about minus 20° C. by the passage of liquefied ammonia through the jacket, were added 100 parts of a carbazole assaying 94.5 per cent in successive small charges of the finely powdered solid so as to maintain the average temperature throughout the addition as near as possible to the initial temperature of minus 20° C., the reaction-mixture being continuously and thoroughly agitated in such manner as to bring the solid carbazole rapidly beneath the surface of the acid and homogeneously to distribute it throughout the latter. When all the carbazole had been added, the reaction-mixture was maintained in agitation for about half-an-hour, the temperature being still kept at about minus 20° C.

The reaction-mixture was then poured in a fine stream into about 30 volumes of dilute aqueous ammonia of a temperature of about 15° C., the mixture being kept alkaline and in continuous agitation throughout. The temperature at the conclusion was about 35° C. The condensation product was thrown down in a readily filtrable form. The precipitate was filtered off, washed with cold water and pressed.

The product was a brownish-purple solid. It was practically completely soluble in alcoholic ammonium sulphide, and was soluble in alcohol to a bright violet solution, and in concentrated sulphuric acid with production of a bright blue colour.

On thionation, this indophenol yielded a first-grade sulphide dye of full strength, that is to say, as compared with the usual dye of commerce. The products obtained by condensation at temperatures substantially higher than minus 20° C. yielded sulphide dyes of lower strength, but still of good quality although derived from indophenols of a degree of purity inferior to that obtained at the lower temperature in question. Lower temperatures than minus 20° C. may be employed for the condensation, but generally speaking, a temperature of this order represents that most convenient for the production of a first-grade product.

What we claim as our invention and desire to secure by Letters Patent is:—

1. The manufacture of condensation products of carbazole and p-nitroso-substituted phenols by bringing carbazole and a p-nitroso-substituted phenol together in presence of a condensing agent at a temperature not exceeding about minus 5° C. and maintaining the reaction-mixture throughout the condensation at a temperature below 0° C.

2. The manufacture of condensation products of carbazole and p-nitroso-substituted phenols by bringing carbazole and a p-nitroso-substituted phenol together in presence of sulphuric acid at a temperature not exceeding about minus 5° C. and maintaining the reaction-mixture throughout the condensation at a temperature below 0° C.

3. The manufacture of condensation products of carbazole and p-nitroso-substituted phenols by bringing carbazole and a p-nitroso-substituted phenol together in presence of a condensing agent at a temperature not exceeding about minus 5° C. and maintaining the reaction-mixture throughout the condensation at substantially the same temperature at which the reacting-substances are initially brought into contact.

4. The manufacture of condensation products of carbazole and p-nitroso-substituted phenols by bringing carbazole and a p-nitroso-substituted phenol together in presence of sulphuric acid at a temperature not exceeding about minus 5° C. and maintaining the reaction-mixture throughout the condensation at substantially the same temperature at which the reacting substances are initially brought together.

5. The manufacture of condensation products of carbazole and p-nitroso-substituted phenols by bringing together carbazole and a p-nitroso-substituted phenol in presence of sulphuric acid at a temperature not exceeding about minus 5° C., maintaining the reaction-mixture throughout the condensation at a temperature below 0° C., and separating the condensation product by addition of the reaction-mixture to dilute aqueous alkali in excess.

6. The manufacture of a condensation product of carbazole and p-nitrosophenol by bringing carbazole and p-nitrosophenol together in presence of sulphuric acid at a temperature not exceeding about minus 5° C. and maintaining the reaction-mixture throughout the condensation at a temperature below 0° C.

7. The manufacture of a condensation product of carbazole and p-nitrosophenol by bringing carbazole and p-nitrosophenol together in presence of sulphuric acid at a temperature not exceeding about minus 5° C., maintaining the reaction-mixture throughout the condensation at a temperature below 0° C., and separating the condensation product by addition of the reaction-mixture to dilute aqueous ammonia in excess.

8. The manufacture of a condensation product of carbazole and p-nitrosophenol by gradual intimate admixture of one of these compounds in a subdivided solid state with a sulphuric acid solution of the other compound at a temperature not exceeding about minus 5° C. and maintaining the reaction-mixture throughout the condensation at a temperature below 0° C.

9. The manufacture of a condensation product of carbazole and p-nitrosophenol by bringing carbazole and p-nitrosophenol together in presence of substantially 92-94 per cent sulphuric acid at a temperature not exceeding about minus 5° C. and maintaining the reaction-mixture throughout the condensation at a temperature below 0° C.

10. The manufacture of a condensation product of carbazole and p-nitrosophenol by bringing carbazole and p-nitrosophenol together in presence of sulphuric acid at a temperature not exceeding about minus 5° C. and maintaining the reaction-mixture throughout the condensation at substantially the same temperature at which the reacting substances are initially brought into contact.

11. The manufacture of a condensation product of carbazole and p-nitrosophenol by bringing carbazole and p-nitrosophenol together in presence of sulphuric acid at a temperature of about minus 20° C. and maintaining the reaction-mixture throughout the condensation at a temperature below 0° C.

12. The manufacture of a condensation product of carbazole and p-nitrosophenol by bringing carbazole and p-nitrosophenol together in presence of sulphuric acid at a temperature of about minus 20° C. and maintaining the reaction-mixture at substantially this temperature throughout the condensation.

13. The manufacture of a condensation product of carbazole and p-nitrosophenol by bringing together carbazole and p-nitrosophenol in presence of substantially 92-94 per cent sulphuric acid at a temperature of about minus 20° C. and maintaining the reaction-mixture at substantially this temperature throughout the condensation.

14. The manufacture of a condensation product of carbazole and p-nitrosophenol by bringing carbazole and p-nitrosophenol together in presence of sulphuric acid at a temperature of about minus 20° C., maintaining the reaction-mixture throughout the condensation at a temperature below 0° C., and separating the condensation product by addition of the reaction-mixture to dilute aqueous ammonia in excess.

15. The manufacture of a condensation product of carbazole and p-nitrosophenol by bringing carbazole and p-nitrosophenol together in presence of sulphuric acid at a temperature of about minus 20° C., maintaining the reaction-mixture at substantially this temperature throughout the condensation, and separating the condensation product by addition of the reaction-mixture to dilute aqueous ammonia in excess.

16. The manufacture of a condensation product of carbazole and p-nitrosophenol by gradual intimate admixture of one of these compounds in a subdivided solid state with a solution of the other compound in approximately 93 per cent sulphuric acid at a temperature of about minus 20° C., maintaining the reaction-mixture at substantially this temperature throughout the condensation, and separating the condensation product by addition of the reaction-mixture to dilute aqueous ammonia in excess.

In testimony whereof we have signed our names to this specification in the presence of two subscribing witnesses.

WILLIAM LEWCOCK.
SNOW BLAGBURN TALLANTYRE.

Witnesses:
N. STREABFULD,
F. W. ELLIS.